(12) United States Patent
Kato

(10) Patent No.: US 10,155,282 B2
(45) Date of Patent: Dec. 18, 2018

(54) FRICTION STIR WELDING METHOD

(71) Applicant: MITSUBISHI HEAVY INDUSTRIES, LTD., Tokyo (JP)

(72) Inventor: Yoshinori Kato, Tokyo (JP)

(73) Assignee: MITSUBISHI HEAVY INDUSTRIES ENGINEERING, LTD., Yokohama-Shi, Kanagawa (JP)

( * ) Notice: Subject to any disclaimer, the term of this patent is extended or adjusted under 35 U.S.C. 154(b) by 31 days.

(21) Appl. No.: 14/917,467

(22) PCT Filed: Jul. 15, 2014

(86) PCT No.: PCT/JP2014/068803
§ 371 (c)(1),
(2) Date: Mar. 8, 2016

(87) PCT Pub. No.: WO2015/068428
PCT Pub. Date: May 14, 2015

(65) Prior Publication Data
US 2016/0221116 A1     Aug. 4, 2016

(30) Foreign Application Priority Data
Nov. 7, 2013 (JP) .................. 2013-231375

(51) Int. Cl.
*B23K 20/12*     (2006.01)
*B23K 101/04*     (2006.01)

(52) U.S. Cl.
CPC .......... *B23K 20/122* (2013.01); *B23K 20/126* (2013.01); *B23K 2101/045* (2018.08)

(58) Field of Classification Search
None
See application file for complete search history.

(56) References Cited

U.S. PATENT DOCUMENTS 6,199,745 B1    3/2001   Campbell et al.
6,290,117 B1*   9/2001   Kawasaki ............ B23K 20/122
                                            228/112.1

(Continued)

FOREIGN PATENT DOCUMENTS

CN    102794558 A    11/2012
CN    102848072 A     1/2013

(Continued)

OTHER PUBLICATIONS

PCT/ISA/210, "International Search Report for International Application No. PCT/JP2014/068803," dated Aug. 12, 2014.

(Continued)

*Primary Examiner* — Devang R Patel
(74) *Attorney, Agent, or Firm* — Manabu Kanesaka; Benjamin J. Hauptman; Kenneth M. Berner

(57) ABSTRACT

In a friction stir welding method, a pair of plate materials is arranged opposing one another such that the ends thereof are butted together, after which friction stir welding is performed. A first shoulder is arranged at one surface of the pair of plate materials and a second shoulder is arranged at the other surface of the plate materials to sandwich therebetween a joint to be formed by friction stirring of the end parts of the plate materials, and the first shoulder and the second shoulder are rotated, thereby friction stirring the joint of the pair of plate materials. As the joint is friction stirred, the first shoulder and the second shoulder are moved from the other surface toward the one surface of the plate materials, thereby forming at the joint a protruding part protruding from the one surface of the plate materials as the friction stir welding is performed.

4 Claims, 4 Drawing Sheets

(56) References Cited

U.S. PATENT DOCUMENTS

| | | | | |
|---|---|---|---|---|
| 2005/0279810 A1* | 12/2005 | Stol | .................... | B23K 20/1225 |
| | | | | 228/112.1 |
| 2012/0006883 A1* | 1/2012 | Nishida | ................ | B23K 20/123 |
| | | | | 228/112.1 |
| 2012/0298724 A1* | 11/2012 | Kato | .................. | B23K 20/1245 |
| | | | | 228/2.1 |
| 2013/0119115 A1* | 5/2013 | Kato | .................. | B23K 20/1255 |
| | | | | 228/112.1 |
| 2014/0119814 A1* | 5/2014 | Osikowicz | ......... | B23K 20/1255 |
| | | | | 403/270 |
| 2014/0231490 A1* | 8/2014 | Sato | .................... | B23K 20/126 |
| | | | | 228/2.1 |

FOREIGN PATENT DOCUMENTS

| | | |
|---|---|---|
| CN | 103068514 A | 4/2013 |
| JP | 2005-007454 A | 1/2005 |
| JP | 2006-088173 A | 4/2006 |
| JP | 2012-170966 A | 9/2012 |

OTHER PUBLICATIONS

PCT/ISA/237, "Written Opinion of the International Searching Authority for International Application No. PCT/JP2014/068803," dated Aug. 12, 2014.

* cited by examiner

FRICTION STIR WELDING METHOD

TECHNICAL FIELD

The present invention relates to a friction stir welding method of friction stirring ends of a pair of plate materials so as to weld the plate materials.

Priority is claimed on Japanese Patent Application No. 2013-231375, filed Nov. 7, 2013, the content of which is incorporated herein by reference.

BACKGROUND ART

In the related art, in order to realize light weight, high rigidity, and improved smoothness, a hollow member which is formed of aluminum alloy and has a double skin structure (two-face structure) is used in a side structure or a floor structure of a vehicle, an aircraft, or the like, a roof structure of a building, or the like. In addition, as a method of butt-welding metal plate materials (plate-shaped members and portions) such as these hollow members, since a method referred to as friction stir welding has many advantages compared to arc welding (TIG, MIG, or the like) or the like such as an advantage in which welding defects of blow holes, solidification cracking, or the like do not easily occur, friction stir welding is widely used.

In addition, as a method for performing friction stir welding, there is a method referred to as a bobbin tool type friction welding method. In this bobbin tool type friction welding method, as shown in FIG. 4, a rotary shaft 1 and a pin-shaped probe 2 on the tip of the rotary shaft 1 are integrally provided so as to be disposed to be coaxial with each other on an axial line O1, and an upper shoulder (first shoulder) 5 and a lower shoulder (second shoulder) 6 are disposed such that a joint (butting portion) S, which is disposed to butt ends 3a and 4a of a pair of plate materials 3 and 4, is interposed between the upper shoulder and the lower shoulder. In addition, the rotary shaft 1 and the probe 2 are rotated around the axial line O1, and the upper and lower shoulders 5 and 6 rotate at high speed while pressing the joint S between the plate materials 3 and 4 with a predetermined pressing force.

Accordingly, friction heat occurs on a contact surface between the joint S between the pair of plate materials 3 and 4 and the shoulders 5 and 6, and the vicinity of the contact surface is plasticized.

Simultaneously, structures of the ends 3a and 4a (joint S) of the pair of plate materials 3 and 4 intermix with each other due to stirring action according to high-speed rotation of the probe 2, and the ends 3a and 4a of the pair of plate materials 3 and 4 can be strongly welded to each other (for example, refer to PTL 1).

CITATION LIST

Patent Literature

[PTL 1] Japanese Unexamined Patent Application Publication No. 2006-88173

SUMMARY OF INVENTION

Technical Problem

However, in the friction stir welding method of the related art, since the upper shoulder 5 and the lower shoulder 6, which are disposed such that the joint S between the pair of plate materials 3 and 4 is interposed therebetween, are rotated at high speed while being pressed with a predetermined pressing force, as shown in FIG. 5, outer surfaces (one surface 7) and an inner surface (the other surface 8) of the plate materials 3 and 4 become recessed. For example, since the plate materials 3 and 4 may be used to be uncoated in a vehicle in which hollow members having a double skin structure are welded, when indentations 9 occur on the outer surface 7 of the plate materials 3 and 4, a disadvantage such as an external appearance of the vehicle being damaged occurs.

Solution to Problem

According to a first aspect of the present invention, there is provided a friction stir welding method in which friction stir welding is performed in a state where ends of a pair of plate materials are disposed to face each other so as to be butted together, including: a step of disposing a first shoulder on one surface of each of the plate materials and a second shoulder on the other surface of each of the plate materials such that a joint which is welded by friction-stirring the ends of the pair of plate materials is interposed between the first shoulder and the second shoulder; a step of rotating the first shoulder and the second shoulder and friction-stirring the joint between the pair of plate materials; and a step of friction-stirring the joint, moving the first shoulder and the second shoulder in a direction from the other surface of each of the plate materials toward the one surface thereof, and performing friction stir welding while forming a protruding portion protruding from the one surface of each of the plate materials on the joint.

Moreover, in a second aspect of the present invention, in the friction stir welding method according to the first aspect, preferably, the friction stir welding method further includes a step of removing the protruding portion such that the joint is flush with one surface of each of portions of the plate materials other than the protruding portion.

Moreover, in a third aspect of the present invention, in the friction stir welding method according to the second aspect, preferably, the plate materials are formed in advance such that a plate thickness of the joint is a predetermined thickness in the state where the protruding portion is removed.

Moreover, in a fourth aspect of the present invention, in the friction stir welding method according to each aspect, preferably, a contact area between the first shoulder and the one surface of each of the plate materials is smaller than a contact area between the second shoulder and the other surface of each of the plate materials.

Moreover, in a fifth aspect of the present invention, in the friction stir welding method according to the first to third aspects, a contact area between the second shoulder and the other surface of each of the plate materials may be smaller than a contact area between the first shoulder and the one surface of each of the plate materials.

Moreover, in a sixth aspect of the present invention, in the friction stir welding method according to each aspect, preferably, the first shoulder and the second shoulder move in the direction from the other surface of each of the plate materials toward the one surface thereof while the one surface of one plate material and the one surface of the other plate material are pressed by a pressing member in a state where the joint is interposed therebetween, and the protruding portion is formed so as to be the joint.

Advantageous Effects of Invention

In a friction stir welding method of the present invention, by disposing a first shoulder and a second shoulder such that a joint (butting portions) which is disposed to butt the ends of a pair of plate materials are interposed between the first shoulder and the second shoulder, rotating the first shoulder and the second shoulder, and moving the first shoulder and the second shoulder in a direction from the other surface of each of the plate materials toward the one surface thereof while friction-stirring the joint between the pair of plate materials plasticized by friction heat, it is possible to perform friction stir welding while forming a protruding portion protruding from the one surface of each of the plate materials on the joint.

Accordingly, unlike in the related art, since the protruding portion is formed in a state where indentations do not occur on the outer surface (one surface) of each of the plate materials, the protruding portion is cut/removed by grinding if necessary, and the protruding portion becomes flush with (becomes smoothly connected to) the one surface of each of portions of the plate materials the protruding portion. Accordingly, a strong joint is formed, and unlike in the friction stir welding method of the related art, it is possible to eliminate a disadvantage such as indentations remaining and an external appearance being damaged.

In addition, in the friction stir welding method of the present invention, by forming the plate materials in advance such that a plate thickness of the joint is a predetermined thickness in the state where the protruding portion is removed, it is possible to prevent the plate thickness of the plate material of the joint from being thinner than portions other than the protruding portion due to the removal of the protruding portion, for example. Accordingly, even when the friction stir welding is performed while the protruding portion protruding from the one surface of each of the plate materials is formed so as to be the joint and the protruding portion is removed, it is possible to secure a desired strength and yield strength of the joint between the plate materials.

In addition, in the friction stir welding method of the present invention, if the contact area between the first shoulder and the one surface of each of the plate materials is smaller than a contact area between the second shoulder and the other surface of each of the plate materials, it is possible to form a small protruding portion corresponding to the difference between the contact areas. Accordingly, when the protruding portion is processed such that the protruding portion is cut off and removed such that there is a flush surface with respect to the one surface of each of portions of the plate materials other than the protruding portion, it is possible to decrease an amount and a size of a region of the cutting with respect to the protruding portion.

Moreover, in the friction stir welding method of the present invention, if the contact area between the second shoulder and the other surface of each of the plate materials is smaller than a contact area between the first shoulder and the one surface of each of the plate materials, when the first shoulder and the second shoulder move in the direction from the other surface of each of the plate materials toward the one surface thereof and the protruding portion protruding from the one surface of each of the plate materials is formed so as to be the joint, it is possible to collectively apply a force to the joint between the pair of plate materials from the second shoulder. Accordingly, the protruding portion is easily formed, and it is possible to appropriately form the protruding portion with a small force.

In addition, in the friction stir welding method of the present invention, the one surface of one plate material and the one surface of the other plate material are pressed by the pressing member in the state where the joint is interposed between the first shoulder and the second shoulder, and in this state, the first shoulder and the second shoulder move in the direction from the other surface of each of the plate materials toward the one surface thereof. Accordingly, a reaction force is secured by the pressing member, it is possible to collectively apply a force to the joint between the pair of plate materials, and it is possible to appropriately form the protruding portion.

DESCRIPTION OF EMBODIMENTS

Figure 1:
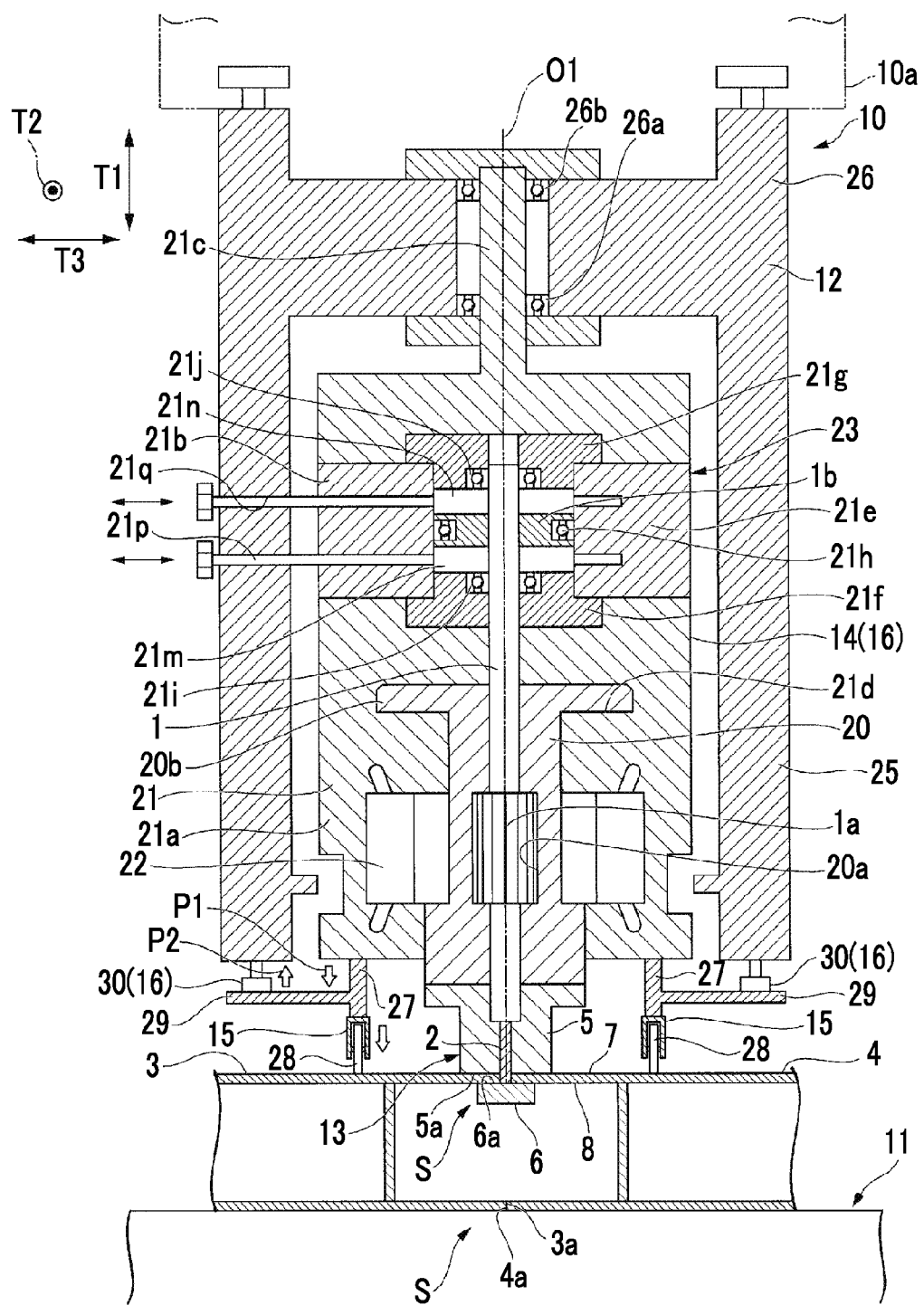
FIG. 1 is a view showing a bobbin tool type friction stir welding device according to an embodiment of the present invention.

Hereinafter, with reference to FIGS. 1 to 3, a friction stir welding method according to an embodiment of the present invention will be described. Here, in the present embodiment, a plate material according to the present invention is a hollow member which is formed of aluminum alloy or the like and has a double skin structure, and the hollow member is used in a side structure or a floor structure of a vehicle, an aircraft, or the like, a roof structure of a building, or the like. In addition, in the present embodiment, friction stir welding is performed such that metal plate materials (plate-shaped members and portions) forming the pair of hollow members are butted to each other. Moreover, the friction stir welding method of the present invention is not limited to the welding of the hollow members, and may be applied to welding of any plate material as long as it can be welded by the known friction stir welding method of the related art.

First, an example of a friction welding device used in the friction stir welding method of the present embodiment will be described. As shown in FIG. 1, in a friction stir welding device 10 of the present embodiment, one plate material (a plate-shaped portion forming a hollow member) 3 and the other plate material 4 are disposed such that ends 3a and 4a of the plate materials 3 and 4 are butted to each other, and a joint (butting portions) S between the pair of plate materials 3 and 4 is welded by friction stir welding.

In addition, the friction stir welding device 10 is configured so as to include a workpiece placement portion 11 on which the plate materials 3 and 4 are disposed, a main body section 12 which is disposed above outer surface (one surface) 7 side of each of the plate materials 3 and 4 with respect to the pair of plate materials 3 and 4 which is a workpiece disposed on the workpiece placement portion 11, and a tool holding portion 14 which is provided in the main body section 12 and holds a bobbin tool 13 serving as a tool.

In addition, the friction stir welding device 10 of the present embodiment includes pressing members 15 which support the tool holding portion 14 above the plate materials 3 and 4 and press the outer surface 7 of each of the plate materials 3 and 4 so as to stably press and hold the plate materials 3 and 4, and load application means 16 for applying a preset load to the pressing members 15 toward the plate materials 3 and 4 disposed on the workpiece placement portion 11.

Figure 2:
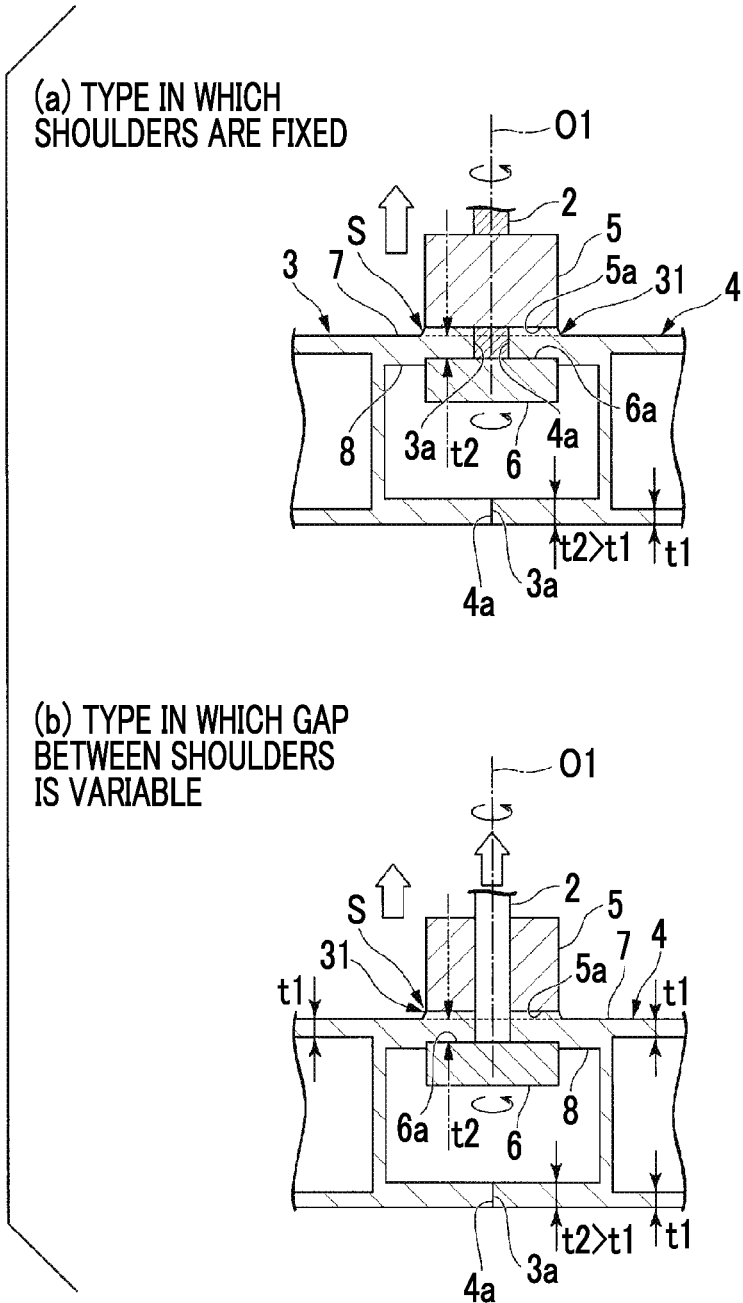
FIG. 2 is a view showing a bobbin type friction stir welding method according to an embodiment of the present invention, (a) is a view when a friction stir welding device in which upper and lower shoulders are fixed to each other is used, and (b) is a view when a friction stir welding device in which a gap between upper and lower shoulders is variable is used.

As shown in FIGS. 1 and 2 (FIG. 2(a): a bobbin tool in which upper and lower shoulders are fixed to each other and FIG. 2(b): a bobbin tool in which a bobbin tool in which a gap between the upper and lower shoulders is variable), the bobbin tool 13 includes an upper shoulder (first shoulder) 5 having a first shoulder surface 5a which is disposed on the outer surface 7 side of each of the plate materials 3 and 4 and presses the outer surface 7, a lower shoulder (second shoulder) 6 having a second shoulder surface 6a which is disposed on an inner surface 8 side of each of the plate materials 3 and 4 and presses the inner surface 8, and a probe 2 which protrudes from the first shoulder surface 5a of the upper shoulder 5 and is connected to the lower shoulder 6.

In addition, a through-hole which is opened to the first shoulder surface 5a is formed on the upper shoulder 5 of the bobbin tool 13, and the probe 2 is inserted into the through-hole. Accordingly, the probe 2 move forward or backward along the through-hole in a vertical direction T1, and it is possible to allow the second shoulder surface 6a to approach or to be separated from the first shoulder surface 5a. That is, the friction stir welding device 10 of the present embodiment is the device in which the gap between the upper and lower shoulders is variable.

Next, as shown in FIG. 1, the tool holding portion 14 is configured so as to include upper shoulder attachment member 20 having an approximately tubular shape in which the upper shoulder 5 of the bobbin tool 13 is attached to the end surface, a lower shoulder attachment shaft (rotary shaft) 1 in which the probe 2 is attached to the tip, and a support tube 21 which is formed in an approximately tubular shape and supports the upper shoulder attachment member 20 and the lower shoulder attachment shaft 1. In addition, the upper shoulder attachment member 20, the lower shoulder attachment shaft 1, and the support tube 21 are disposed so as to be coaxial with one another on a center axial line O1 and are provided along the vertical direction T1 in which a direction of the center axial line O1 faces the plate materials 3 and 4 which are workpieces.

The upper shoulder attachment member 20 is formed in an approximately tubular shape, the lower shoulder attachment shaft 1 is inserted into a hole of the upper shoulder attachment member 20, and the lower shoulder attachment shaft 1 is provided such that the base end protrudes from the upper shoulder attachment member 20. In addition, a key 1a, which extends along the axial line O1 direction on a portion which is inserted into the upper shoulder attachment member 20, is formed in the lower shoulder attachment shaft 1, and a flat plate-shaped piston 1b is provided so as to extend in a radial direction on a portion protruding from the upper shoulder attachment member 20.

Meanwhile, a key groove 20a, with which the key 1a provided in the lower shoulder attachment shaft 1 engages, is formed on the upper shoulder attachment member 20 along the center axial line O1. Accordingly, the lower shoulder attachment shaft 1 is provided so as to be non-rotatable with respect to the upper shoulder attachment member 20 around the center axial line O1, and so as to move forward or backward in the center axial line O1.

The support tube 21 is configured to include an attachment member accommodation portion 21a which is opened downward and rotatably accommodates the upper shoulder attachment member 20 around the center axial line O1, a cylinder portion 21b which moves the lower shoulder attachment shaft 1 forward or backward along the center axial line O1, and a shaft-shaped supported portion 21c which is supported by the main body section 12 and protrudes from the cylinder portion 21b on the center axial line O1.

A bearing portion 21d, which accommodates a flange 20b of the upper shoulder attachment member 20 and rotatably supports the flange 20b around the center axial line O1, is formed in the attachment member accommodation portion 21a. In addition, a motor 22, which rotates the upper shoulder attachment member 20 around the center axial line O1, is built in an inner peripheral surface of the attachment member accommodation portion 21a. Accordingly, the upper shoulder attachment member 20 and the lower shoulder attachment shaft 1, which are connected to each other due to the engagement between the key 1a and the key groove 20a, can rotate around the center axial line O1 by driving of the motor 22.

The cylinder portion 21b is configured to include a piston support portion 21e having an approximately tubular shape which supports the piston 1b, and a tip side support portion 21f and a base-end side support portion 21g which are provided on openings of a tip side and a base-end side of the piston support portion 21e so as to support the lower shoulder attachment shaft 1.

In addition, a bearing 21h is provided on an outer peripheral surface of the piston 1b, and due to the bearing 21h, the piston 1b is supported so as to move forward or backward with respect to the piston support portion 21e along the center axial line O1 and so as to be rotatably supported around the center axial line O1. In addition, bearings 21i and 21j are respectively provided in the tip side support portion 21f and the base-end side support portion 21g, and due to the bearings 21i and 21j, the lower shoulder attachment shaft 1 is supported so as to move forward or backward with respect to the piston support portion 21e along the center axial line O1 and so as to be rotatably supported around the center axial line O1.

Moreover, a first hydraulic chamber 21m and a second hydraulic chamber 21n, to which a hydraulic oil is supplied, are formed between the piston 1b, and the tip side support portion 21f and the base-end side support portion 21g. Moreover, hydraulic oil supply lines 21p and 21q, which penetrate the main body section 12 so as to be connected to the outside and respectively communicate with the first hydraulic chamber 21m and the second hydraulic chamber 21n, are formed in the cylinder portion 21b.

Accordingly, a hydraulic pressure is selectively input to the first hydraulic chamber 21m or the second hydraulic chamber 21n via the hydraulic oil supply lines 21p and 21q by a hydraulic control device (not shown) provided on the outside, and it is possible to allow the lower shoulder attachment shaft 1 to slide to the tip side or the base-end side along the center axial line O1. In addition, pressurizing means 23 is configured of the hydraulic control device, the cylinder portion 21b, and the piston 1b, the pressurizing means 23 applies a force to the plate materials 3 and 4 disposed the workpiece placement portion 11 along the center axial line O1, the second shoulder surface 6a of the lower shoulder 6 is pressed to the plate materials 3 and 4, and the plate materials 3 and 4 which are disposed on the workpiece placement portion 11 can be pressurized.

The main body section 12 is attached to a machining device main shaft 10a. In addition, the main body section 12 is formed in an approximately tubular shape, and is configured so as to include an accommodation portion 25 which is opened toward the lower side close to the outer surface 7 side of the plate materials 3 and 4 disposed in the workpiece placement portion 11 and in which the tool holding portion 14 is accommodated, and a main body support portion 26 which supports the tool holding portion 14 accommodated in the accommodation portion 25 so as to be moved forward or backward in a vertical direction T1 in which the tool holding portion 14 approaches or is separated from the plate materials 3 and 4. The main body support portion 26 includes bearings 26a and 26b, and supports the supported portion 21c by the bearings 26a and 26b so as to be movable forward or backward along the center axial line O1.

The pressing members 15 include support members 27 which protrudes from a lower end surface of the attachment member accommodation portion 21a of the tool holding portion 14, rollers 28 which are rotatably supported by the support member 27 and come into contact with the outer surfaces of the plate materials 3 and 4, and projecting members 29 which are provided so as to be projected from the support member 27 in the radial direction.

Moreover, the pressing members 15 are disposed in pair on both sides such that the bobbin tool 13 is interposed between the pressing members 15 in a lateral direction T3 orthogonal to a direction of welding (an inner side direction on a paper surface in FIG. 1) T2 in which the bobbin tool 13 held by the tool holding portion 14 is scanned. In addition, each of the rollers 28 is provided so as to be rotatable around the rotary shaft disposed along the lateral direction T3 orthogonal to the direction of welding, and this is, is provided so as to be rolled on the outer surface 7 of each of the plate materials 3 and 4 in the direction of welding T2 according to scanning of the bobbin tool 13.

The load application means 16 is configured so as to include the tool holding portion 14 to which the pressing member 15 is connected and which applies a downward tool holding portion's weight and a force P1 of the weight of the held bobbin tool 13, and a lifting force application portion 30 which is provided between the projecting member 29 and the lower end surface of the main body section 12 and operates an auxiliary force P2 in the direction along the center axial line O1.

For example, the lifting force application portion 30 is an air cylinder, and it is possible to adjust the force (P1) which is applied from the rollers 28 to the plate materials 3 and 4 by driving of the air cylinder. In addition, the pressing member 15 of the present embodiment is configured such that the support member 27 can be extended or contracted according to extension and contraction of the lifting force application portion 30, and if the lifting force application portion 30 is extended, it is possible to the main body section 12, the tool holding portion 14, the upper shoulder 5, and the lower shoulder 6 in a direction from the inner surface 8 of each of the plate materials 3 and 4 toward the outer surface 7. That is, if the lifting force application portion 30 is extended, it is possible to pull the upper shoulder 5 and the lower shoulder 6 upward with respect to the plate materials 3 and 4.

In addition, when the ends 3a and 4a of the pair of plate materials 3 and 4 are welded to each other using the friction stir welding device 10 of the present embodiment having the above-described configuration, the upper shoulder 5 is disposed on the outer surface (one surface) 7 side of each of the plate materials 3 and 4 and the lower shoulder 6 is disposed on the inner surface (the other surface) 8 side of each of the plate materials 3 and 4 such that the joint S, which welds the ends 3a and 4a of the pair of plate materials 3 and 4 by friction stirring, is interposed between the upper shoulder 5 and the lower shoulder 6. In addition, the rollers 28 of the pressing members 15 are disposed on the outer surfaces 7 of the plate materials 3 and 4. In this state, the upward auxiliary force P2 having predetermined strength is applied to the pair of plate materials 3 and 4 by the lifting force application portion 30, and the load P1 from the pressing members 15 is applied to the pair of plate materials 3 and 4.

Moreover, the motor 22 is driven, the entire tool holding portion 14 is rotated, and an upward pressing force is applied to the lower shoulder 6 by the pressurizing means 23. Accordingly, in each of the pair of plate materials 3 and 4, the inner surface 8 receives the pressing force from the second shoulder surface 6a, and the force corresponding to the pressing force is similarly applied to the outer surface 7 from the first shoulder surface 5a. Accordingly, for example, friction heat of approximately 400° C. to 500° C. is generated between the first shoulder surface 5a and the second shoulder surface 6a, that is, between the outer surface 7 and the inner surface 8 of each of the pair of the plate materials 3 and 4, and according to this friction heat, the joint S between the plate materials 3 and 4 is softened, the softened portion is stirred, and the ends 3a and 4a of the pair of the plate materials 3 and 4 are welded to each other by friction stirring.

Meanwhile, in the friction stir welding method of the present embodiment, as shown in FIG. 2, the joint S between the pair of plate materials 3 and 4 is friction-stirred by rotating the upper shoulder 5 and the lower shoulder 6, and the upper shoulder 5 and the lower shoulder 6 is moved in a direction from the inner surface 8 of each of the plate materials 3 and 4 toward the outer surface 7 thereof by driving the lifting force application portion 30. That is, the upper shoulder 5 and the lower shoulder 6 are pulled upward. Accordingly, a protruding portion 31 protruding upward from the outer surface 7 of each of the plate materials 3 and 4 forms the joint S, and friction stir welding is performed on the protruding portion.

In addition, in this case, for example, the upper shoulder 5 and the lower shoulder 6 are pulled with a pulling force of approximately 10 kgf to 50 kgf, and the protrusion portion 31 having a protrusion height of 0.3±0.2 mm, preferably, a protrusion height of approximately 0.1 mm to 0.5 mm is formed.

Figure 3:
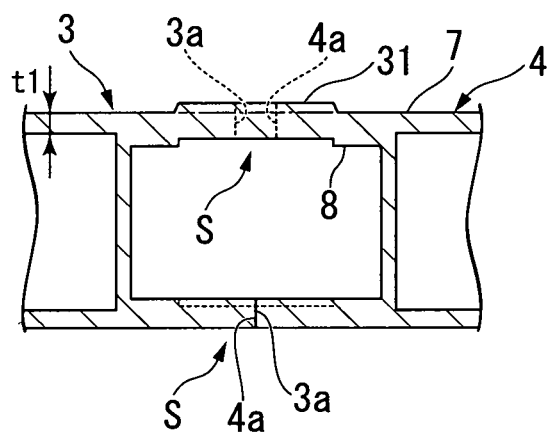
FIG. 3 is a view showing a state where a protruding portion formed by the friction stir welding method according to the embodiment of the present invention is removed.
Figure 3:
Figure 3:
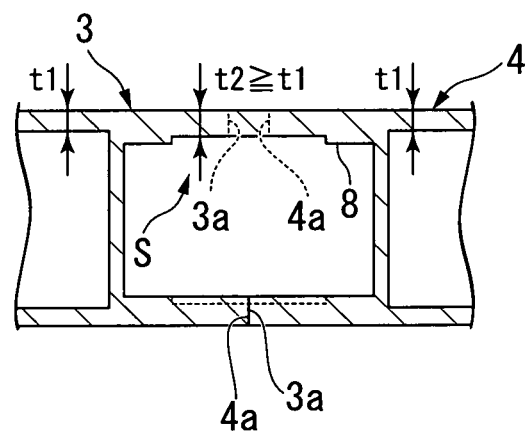
Figure 4:
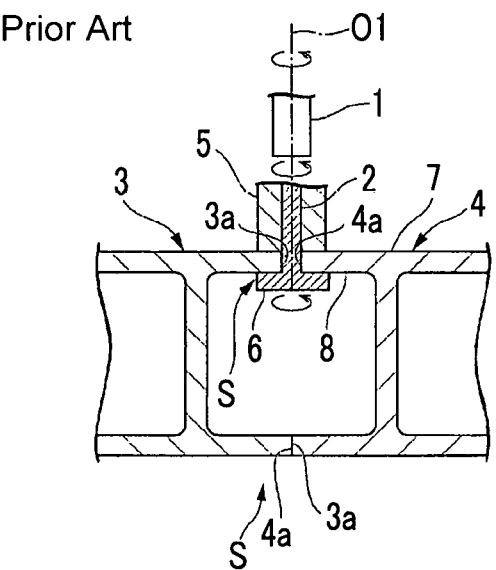
FIG. 4 is a view showing a bobbin tool type friction stir welding method of the related art.
Figure 5:
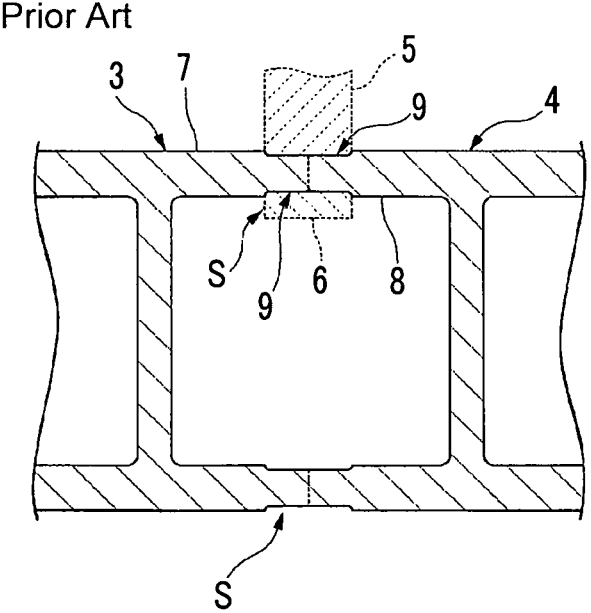
FIG. 5 is a view showing a joint (butting portion) of the bobbin tool type friction stir welding method of the related art.

Moreover, in the present embodiment, as shown in FIG. 3, the protruding portion 31 is cut/removed by grinding, and the joint S becomes flush with (smoothly connected to) the outer surface 7 of each of portions of the plate materials 3 and 4 other than the protruding portion. Accordingly, unlike the related art, the welding operation is performed in a state where an improved external appearance is maintained without generating indentations on the outer surface 7 of the joint S between the plate materials 3 and 4.

Here, in the friction stir welding method of the present embodiment, as shown in FIGS. 2 and 3, the plate materials 3 and 4 are formed such that a plate thickness t2 of the joint S is larger than a plate thickness t1 of each of portions of the plate materials 3 and 4 other than the protruding portion in advance, and for example, in the state where the protruding portion 31 is removed, the plate thickness t2 of the joint S is equal to or more than the plate thickness t1 of the portion other than the protruding portion. That is, in the present embodiment, the plate materials 3 and 4 are formed in advance such that the plate thickness t2 of the joint S is a predetermined thickness in the state where the protruding portion 31 is removed.

Accordingly, during the friction stir welding, the protruding portion 31 is formed by pulling the upper shoulder 5 and the lower shoulder 6 upward, and even when the protruding portion 31 is removed, the plate thickness t2 of the joint S can be equal to or more than the plate thickness t1 of each of portions other than the protruding portion, and there is no concern that yield strength of the joint S or the like may decrease.

In addition, in the present embodiment, by pulling the upper shoulder 5 and the lower shoulder 6 upward while pressing the outer surface 7 of one plate material 3 and the outer surface 7 of the other plate material 4 by the pressing member 15 in the state where the joint S is interposed between the upper shoulder and the lower shoulder, the protruding portion 31 is formed so as to be the joint S. Accordingly, a reaction force is secured by the pressing member 15 during the upward pulling, and a force is collectively applied to the joint S between the plate materials 3 and 4. Accordingly, it is possible to reliably and suitably form the protruding portion 31 having a desired height and size.

In addition, a contact area between the upper shoulder 5 and the outer surface of each of the plate materials 3 and 4 may be smaller than a contact area between the lower shoulder 6 and the inner surface 8 of each of the plate materials 3 and 4. That is, an area of the first shoulder surface 5a of the upper shoulder may be smaller than an area of the second shoulder surface 6a of the lower shoulder 6. In this case, the formed protruding portion 31 is relatively small, and when the protruding portion 31 is cut/removed by grinding, labor of the operation decreases.

Conversely, a contact area between the lower shoulder 6 and the inner surface 8 of each of the plate materials 3 and 4 may be smaller than a contact area between the upper shoulder 5 and the outer surface 7 of each of the plate materials 3 and 4. That is, the area of the second shoulder surface 6a of the lower shoulder 6 may be smaller than the area of the first shoulder surface 5a of the upper shoulder. In this case, when the upper shoulder 5 and the lower shoulder 6 are pulled upward, a force is collectively applied from the small lower shoulder 6 to the joint S between the pair of plate materials 3 and 4. Accordingly, the protruding portion 31 is easily formed, and it is possible to appropriately form the protruding portion 31 with a small force.

Accordingly, in the friction stir welding method of the present embodiment, by disposing the upper shoulder (first shoulder) 5 and the lower shoulder (second shoulder) 6 such that joint (butting portions) S which is disposed so as to butt the ends 3a and 4a of the pair of plate materials 3 and 4 is interposed between the upper shoulder and the lower shoulder, rotating the upper shoulder 5 and the lower shoulder 6, and pulling the upper shoulder 5 and the lower shoulder 6 upward while friction-stirring the joint S between the pair of plate materials 3 and 4 plasticized by friction heat, it is possible to perform the friction stir welding while forming the protruding portion 31 protruding from the outer surface (one surface) 7 of each of the plate materials 3 and 4 on the joint S.

Accordingly, unlike the related art, since the protruding portion 31 is formed a state where indentations do not occur on the outer surface 7 of each of the plate materials 3 and 4, the protruding portion 31 is cut/removed by grinding if necessary, and the protruding portion 31 is flush with the one surface 7 of each of portions of the plate materials 3 and 4 other than the protruding portion. Accordingly, a strong joint is formed, and unlike the friction stir welding method of the related art, it is possible to eliminate a disadvantage such as indentations remaining and an external appearance being damaged.

In addition, in the friction stir welding method of the present invention, by forming the plate materials 3 and 4 in advance such that the plate thickness t2 of the joint S is equal to or more than the predetermined thickness (t1) in the state where the protruding portion 31 is removed, it is possible to prevent the plate thickness t2 of each of the plate material 3 and 4 of the joint S from being thinner than portions other than the protruding portion due to the removal of the protruding portion 31, for example. Accordingly, even when the friction stir welding is performed while the protruding portion 31 protruding from the outer surface 7 of each of the plate materials 3 and 4 is formed so as to be the joint S and the protruding portion 31 is removed, it is possible to secure desired strength and yield strength of the joint S between the plate materials 3 and 4.

In addition, in the friction stir welding method of the present invention, if the contact area between the upper shoulder 5 and the outer surface 7 of each of the plate materials 3 and 4 is smaller than the contact area between the lower shoulder 6 and the other surface 8 of each of the plate materials 3 and 4, it is possible to form a small protruding portion 31 corresponding to the difference between the contact areas. Accordingly, when the protruding portion 31 is processed such that the protruding portion 31 is cut off and removed such that there is a flush surface with respect to the outer surface 7 of each of the portions of the plate materials 3 and 4 other than the protruding portion, it is possible to decrease a processing amount and a region of the cutting.

Moreover, if the contact area between the lower shoulder 6 and the inner surface 8 of each of the plate materials 3 and 4 is smaller than a contact area between the upper shoulder 5 and the outer surface 7 of each of the plate materials 3 and 4, when the upper shoulder 5 and the lower shoulder 6 are pulled upward and the protruding portion 31 is formed so as to be the joint S, it is possible to collectively apply a force to the joint S between the pair of plate materials 3 and 4 from the lower shoulder 6. Accordingly, the protruding portion 31 is easily formed, and it is possible to appropriately form the protruding portion 31 with a small force.

In addition, the outer surface 7 of one plate material 3 and the outer surface 7 of the other plate material 4 are pressed by the pressing member 15 in the state where the joint S is interposed between the first shoulder and the second shoulder, and in this state, the upper shoulder 5 and the lower shoulder 6 are pulled upward. Accordingly, a reaction force is secured by the pressing member 15, it is possible to collectively apply a force to the joint S between the pair of plate materials 3 and 4, and it is possible to appropriately form the protruding portion 31.

Hereinbefore, the embodiment of the friction stir welding method according to the present invention is described. However, the present invention is not limited to the embodiment and may be appropriately modified within a scope which does not depart from the gist.

INDUSTRIAL APPLICABILITY

According to a friction stir welding method according to the present invention, it is possible to perform friction stir welding such that hollow members are butted to each other, in which the hollow members are used in a side structure or a floor structure of a vehicle, an aircraft, or the like, a roof structure of a building, or the like, are formed of aluminum alloy, and have a double skin structure, and metal plate materials (plate-shaped members and portions) forming a pair of hollow members are butted to each other. In addition, the friction stir welding method of the present invention is limited to the welding of the hollow members, and may be applied to welding of any plate material as long as it can be welded by the known friction stir welding method of the related art.

REFERENCE SIGNS LIST

1: lower shoulder attachment shaft (rotary shaft)
1a: key
1b: piston
2: probe
3: plate material (one plate material)
3a: end
4: plate material (the other plate material)
4a: end
5: upper shoulder (first shoulder)
5a: first shoulder surface
6: lower shoulder (second shoulder)
6a: second shoulder surface
7: outer surface (one surface)
8: inner surface (the other surface)
9: indentation
10: friction stir welding device
10a: machining device main shaft
11: workpiece placement portion
12: main body section
13: bobbin tool
14: tool holding portion
15: pressing member
16: load application means
20: upper shoulder attachment member
20a: key groove
20b: flange
21: support tube
21a: attachment member accommodation portion
21b: cylinder portion
21c: supported portion
21d: bearing portion
21e: piston support portion
21f: tip side support portion
21g: base-end side support portion
21h: bearing
21i: bearing
21j: bearing
21m: first hydraulic chamber
21n: second hydraulic chamber
21p: hydraulic oil supply line
21q: hydraulic oil supply line
22: motor
23: pressurizing means
25: accommodation portion
26: main body support portion
26a: bearing
26b: bearing
27: support member
28: roller
29: projecting member
30: lifting force application portion
31: protruding portion O1: axial line (center axial line)
S: joint (butting portion)
T1: vertical direction
T2: direction of welding
T3: lateral direction
t1: plate thickness
t2: plate thickness

The invention claimed is:

1. A friction stir welding method in which friction stir welding is performed in a state where ends of a pair of plate materials are disposed to face each other so as to be butted together, the method comprising:
a step of disposing a first shoulder on one surface of each of the plate materials and a second shoulder on the other surface of each of the plate materials such that a joint which is welded by friction-stirring the ends of the pair of plate materials is interposed between the first shoulder and the second shoulder;
a step of rotating the first shoulder and the second shoulder and friction-stirring the joint between the pair of plate materials;
a step of friction-stirring the joint, moving the first shoulder and the second shoulder in a direction from the other surface of each of the plate materials toward the one surface thereof, and performing friction stir welding while forming a single protruding portion to be removed which is protruding from the one surface of each of the plate materials over an entire surface of the joint, wherein the first shoulder and the second shoulder are moved in the direction from the other surface of each of the plate materials toward the one surface with a force between 10 kgf and 50 kgf to form the single protruding portion having a protrusion height between 0.1 mm and 0.5 mm; and
a step of removing the single protruding portion such that the joint is flush with the one surface of each of portions of the plate materials other than the single protruding portion, and a plate thickness of the joint is equal to or more than plate thicknesses of portions other than the joint in the state where the single protruding portion is removed.

2. The friction stir welding method according to claim 1, wherein a contact area between the first shoulder and the one surface of each of the plate materials is smaller than a contact area between the second shoulder and the other surface of each of the plate materials.

3. The friction stir welding method according to claim 1, wherein a contact area between the second shoulder and the other surface of each of the plate materials is smaller than a contact area between the first shoulder and the one surface of each of the plate materials.

4. The friction stir welding method according to claim 1, wherein the first shoulder and the second shoulder move in the direction from the other surface of each of the plate materials toward the one surface thereof while the one surface of one plate material and the one surface of the other plate material are pressed by a pressing member in a state where the joint is interposed therebetween, and the single protruding portion is formed so as to be the joint.

* * * * *